Figure 1:
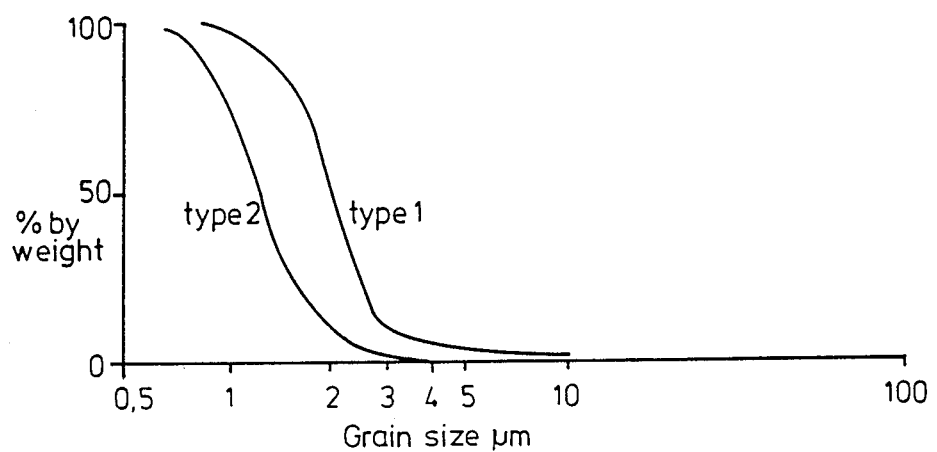

United States Patent [19]

Ohm et al.

[11] Patent Number: 4,868,053

[45] Date of Patent: Sep. 19, 1989

[54] FLAME RESISTANT, HALOGEN-FREE THERMOPLASTIC POLYMER COMPOSITIONS

[75] Inventors: Christian Ohm, Leverkusen; Stephen D. Pask, Dormagen; Wolfgang Wieder, Leverkusenl; Werner Obrecht, Moers; Karl-Heinz Schabel, Burscheid, all of Fed. Rep. of Germany

[73] Assignee: Bayer Aktiengesellschaft, Leverkusen, Fed. Rep. of Germany

[21] Appl. No.: 181,115

[22] Filed: Apr. 13, 1988

[30] Foreign Application Priority Data

Apr. 24, 1987 [DE] Fed. Rep. of Germany ....... 3713671
Feb. 4, 1988 [DE] Fed. Rep. of Germany ....... 3803269

[51] Int. Cl.$^4$ ...................... C08L 31/04; C08L 23/08; C08J 3/24; H01B 3/22
[52] U.S. Cl. .................................. 428/379; 428/375; 524/413; 524/437; 524/456; 524/503; 524/524; 525/194; 525/222
[58] Field of Search ............... 524/413, 437, 524, 456, 524/503; 525/222, 194; 428/379, 375

[56] References Cited

U.S. PATENT DOCUMENTS

| | | | |
|---|---|---|---|
| 4,228,250 | 10/1980 | Pritchett | 525/57 |
| 4,302,557 | 11/1981 | Yoshimura et al. | 525/211 |
| 4,322,575 | 3/1982 | Skipper | 525/222 |
| 4,571,410 | 2/1986 | Nevins et al. | 524/524 |
| 4,639,487 | 1/1987 | Hazelton et al. | 524/524 |
| 4,725,637 | 2/1988 | Feruyhough et al. | 525/194 |
| 4,735,986 | 4/1988 | Iacoviello | 524/503 |
| 4,743,644 | 5/1988 | Skipper et al. | 524/437 |
| 4,791,160 | 12/1988 | Kato et al. | 524/437 |

*Primary Examiner*—Herbert J. Lilling
*Attorney, Agent, or Firm*—Connolly and Hutz

[57] ABSTRACT

The present invention relates to thermoplastically processible polymer materials with good mechanical properties and high flame resistance.

8 Claims, 1 Drawing Sheet

FLAME RESISTANT, HALOGEN-FREE THERMOPLASTIC POLYMER COMPOSITIONS

Halogen-free polymer materials which have good mechanical properties and can be thermoplastically processed are increasingly required, in particular for cable and conductor sheaths, but also for other applications, e.g. as floor coverings.

The thermoplastic processibility of a material provides the possibility of a rational production method for moulded articles e.g. by extrusion and reusing of residues of material and/or process waste.

The flame resistance of polymer materials is increased by blending them with mineral fillers and/or with organic and inorganic substances which contain halogen or alternatively, polymers with a high halogen content may be used; the latter are also frequently blended with fillers. Polymer materials which are blended with halogen-containing additives or in which the polymers themselves contain halogens have serious weaknesses. In the event of fire they may lead to harmful secondary consequences (health hazards due to fumes; corrosive damage to the building material) worse than the damage caused by the fire itself.

The flame resistance of polymer materials is measured in terms of LOI (Limiting Oxygen Index) which corresponds to the oxygen concentration at which a burning test sample just fails to be extinguished. A material having a LOI below 20 is therefore not self extinguishing in the atmosphere in the event of fire (ASTM D-2863).

DIN 57 207 (DIN=German Industrial Standard) and VDE Standard 0207 (part 24) require a halogen-free cable sheath compounds (inter alia) not only that their combustion gases should be non-corrosive but also that they should have a minimum strength of 6·5 MPa with an elongation at break of at least 125%.

Materials which satisfy these requirements are known, but there is an increasing demand for even better materials which should not only have a LOI value above 30 and also a good strength, but, if possible, an elongation at break of 200% or more.

DE-OS No. 2 947 332 describes polymers consisting of a cross-linked vinyl acetate/alkene copolymer or a mixture of cross-linked vinyl acetate/alkene copolymer and further polymer components. DE-OS No. 2 805 930 describes inter alia mixtures of cross-linked vinyl acetate/alkene copolymer and polyolefin such as, for example, polypropylene and polyethylene. The said Offenlegungschriften also describe a dynamic cross-linking.

Dynamic cross-linking is a process which has been disclosed, for example, in U.S. Pat. No. 3,037,954, and it may sometimes be advantageous to carry out only partial cross-linking (see e.g. U.S. Pat. No. 3,862,106). The quantities of cross-linking chemicals required and suitable parameters for the process must be determined according to the individual polymer.

Unfilled, partially cross-linked polymer mixtures of polyethylene and ethylene/vinyl acetate copolymer are described in U.S. Pat. No. 3,399,250. Similar preparations of partially crosslinked ethylene/vinyl acetate copolymer and polypropylene are described in U.S. Pat. No. 4,232,132. Such preparations have the typical advantages of thermoplastic resins which contain partially or completely cross-linked rubber, but their fire characteristics are entirely inadequate for the present purpose.

Preparations based on uncross-linked vinyl acetate/ethylene copolymer are also known in the literature as flame resistant, thermoplastic, halogen-free moulding compounds. Thus DE-OS No. 3 047 269 and DEOS No. 3 306 776 describe mixtures of a rubber-like vinyl acetate/ethylene copolymer with a plastics type (plastomer) of vinyl acetate/ethylene copolymer, DE-OS No. 3 047 269 describes that such mixtures of two different vinyl acetate/ethylene copolymers can be mixed with a very high proportion of filler. As was to be expected (see e.g. DE-OS No. 2 947 332 and DE-OS No. 3 104 984), the LOI of such highly filled polymer preparations is all the higher, the greater their filler content.

Another example from the state of the art is FR-A No. 8 400 640, which describes highly filled, thermoplastically processible mixtures based on vinyl acetate/ethylene copolymer. The said specification describes the major improvements which can be achieved by using filler-polymer coupling agents.

No materials satisfying the strict requirements of the given problems, however, could be produced according to this state of the art.

It has now surpisingly been found that mixtures of ethylene/vinyl acetate copolymers, one of which having a low and the other of which having a high content of vinyl acetate units, are particularly suitable for use as a polymer basis for flame resistant, halogen-free, thermoplastically processible compositions, provided that the copolymers have been dynamically cross-linked.

The invention provides halogen-free, thermoplastically processable compositions consisting of I. from 20 to 50, preferably 30 to 50, parts by weight of ethylene/vinyl acetate copolymer containing from 5 to 15, preferably 5 to 10,% by weight of vinyl acetate units, II. from 80 to 50, preferably to 50, parts by weight of ethylene/vinyl acetate copolymer containing from 42 to 75, preferably 60 to 70,% by weight of vinyl acetate units, III. from 150 to 220, preferably 160 to 200, parts by weight of mineral filler per 100 parts by weight of components I+II, and optionally, processing aids and/or other additives, characterized in that the copolymers have been dynamically cross-linked.

The preferred ethylene/vinyl acetate copolymers having a content of from 5 to 15% by weight of vinyl acetate units have melt indices (190° C./2, 16 Kp according to DIN No. 53 735) of from 0·15 to 1·8 g/10 minutes. Polymers with melt indices of from 1·3 to 1·8 g/10 minutes are particularly suitable. Such polymers are partly crystalline and their Vicat softening temperatures (VST A according to DIN No. 53 460) are in the range of from 75° to 95° C. Polymers which have Vicat softening temperatures in the region of 75° to 85° C. are particularly advantageous.

The preferred ethylene/vinyl acetate copolymers having a content of from 42 to 70% by weight of vinyl acetate units are substantially straight chained polymers with little or no crystalline regions. They have Mooney viscosities (ML-4 (100° C.) according to DIN No. 53 523) of from 15 to 40 MU. Polymers with Mooney viscosities (ML-4 (100° C.)) of from 20 to 30 MU are particularly suitable. Ethylene/vinyl acetate copolymers may be prepared by radical initiated polymerisation of ethylene and vinyl acetate at high pressures or in solution at medium pressures.

Although simple copolymers of ethylene and vinyl acetate are particularly preferred starting materials, terpolymers containing up to 5% by weight of copolymerised termonomer units such as acrylic acid, methacrylic acid or maleic acid units may also advantageously be used for the present invention.

In the description of preparations according to the invention given below, parts by weight of the components are based on 100 parts by weight of polymer.

In order to obtain the required properties and to ensure thermoplastic processibility (e.g. for extrusion process), it is essential that the preparations should be dynamically cross-linked. "Dynamic cross-linking" in the sense of the present invention means a process, where the polymer mixture is masticated in the presence of the curative and, optionally, of a co-curative during cross-linking. The term "dynamic" indicates that the mixture is subjected to shear forces during cross-linking as contrasted with "static" cross-linking without applying shear forces during the cross-linking process.

The shear rate (i.e. in the case of an extruder, the quotient of [product of the circumference of the maximum circle generated by the screw tip times the revolutions of the screw per second] and the tip clearance (=distance between the circumference of the screw and the wall of the chamber), in other words: tip velocity divided by the tip clearance) is, in general above 100 $sec^{-1}$, preferably above 100 $sec^{-1}$, in particular from 2000 to 7000 $sec^{-1}$. The maximum shear rate is only limited by the risk of thermal damage to the polymers.

The dynamic cross-linking is appropriately carried out at a temperature above the softening temperature of the higher melting copolymer, preferably from 20° to 50° C. above this softening temperature (determined by differential thermoanalysis).

Dynamic cross-linking requires a residence time in the curing zone of at least four times the half-life of the peroxide used (at the temperature of the dynamic cross-linking).

Suitable aggregates for carrying out the crosslinking process include kneaders such as, for example, Banbury and Brabender mixers, or mixing extruders such as, for example, single and twin screw extruders.

Particularly preferred peroxides are, for example, dicumyl peroxide, 2,5-bis-(t-butyl peroxide-2,5-dimethylhexane) and 4,4'-bis(t-butylperoxy)-diisopropyl benzene. It is important that the peroxide should not decompose at temperatures below 125° C., or only very slowly. Particularly suitable are those peroxides which have a decomposition half life of 1 minute at temperatures of from 130° to 190° C.

The cross-linking agents or co-agents are polyfunctional organic or organometallic compounds which on their own have little or no capacity to bring about cross-linking of the polymers. Examples of such compounds include triallyl cyanurate, triallyl isocyanurate, pentaerythritol tetramethacrylate and N,N'-m-phenylene dimaleimide, the latter compound being particularly preferred.

Dynamic cross-linking may be carried out in the presence or absence of the filler but if comparable mechanical properties are to be obtained, it is necessary to use larger quantities of cross-linking agents for the dynamic cross-linking of mixtures which contain fillers.

Mixtures which are free from fillers can be filled after the dynamic cross-linking.

Dynamic cross-linking is carried out, preferably with not more than $$\left(0.25 + \frac{\text{parts by weight of filler*}}{2000}\right)$$

parts by weight of peroxide or not more than $$\left(0.8 + \frac{\text{parts by weight of filler*}}{500}\right)$$

parts by weight of peroxide and cross-linking agent. Filler* refers to the amount filler III present during the dynamic cross-linking process.

At all events, a much smaller quantity of cross-linking agents (about ⅓) is used than would be required for a complete static vulcanisation, i.e. vulcanisation carried out without subjecting the material to any shearing forces at the same time.

Particularly preferred fillers are those which split off water when heated, in particular aluminium hydroxide or hydrated aluminium oxide of the general formula $Al_2O_3 \cdot xH_2O$ wherein x has a value of from 0.5 to 3.0, especially $Al_2O_3 \cdot 3H_2O$, hydrated magnesium oxide or magnesium hydroxide and hydrated calcium silicate. Mixtures containing more than 50% by weight (based on the total quantity of filler) of the above fillers may advantageously be used together with other fillers, e.g. carbon black and/or silicon oxide in the preparations according to the invention. Other examples such as mixtures of the above mentioned hydroxides with less than 50% by weight of magnesium carbonate and/or chalk and/or zinc borate have proved to be particularly suitable. Especially preferred fillers are those in which less than 10% by weight of the particles have a diameter greater than 3 $\mu$m and at least 50% by weight of the particles have a diameter less than 2 $\mu$m.

The filler is optionally chemically treated to improve its compatibility with the polymer material or to bring about coupling with one of the polymers or both. Stearates and stearic acid are examples of chemical treatment agents. Fillers used as coupling agents may be, for example, silanes such as dimethyl dichlorosilane, methyl trichlorosilane, vinyl trichlorosilane, methacryloxypropyl-trimethoxysilane and vinyl trimethoxysilane. Further examples of coupling agents are given in DE-A No. 2 947 332 and in the literature cited there. Surface treating agents are normally used in a proportion by weight (based on the filler) of from (1:1000) to (100:1000), preferably from (5:1000) to (50:1000).

According to an especially preferred version of the invention, 0.1 to 20 parts by weight of hydrolysed ethylene/vinyl acetate copolymer having a degree of hydrolysis of from 70 to 100, preferably from 85 to 99, % per 100 parts by weight of components I+II are added. Preferred hydrolysed ethylene/vinyl acetate copolymers are those from ethylene/vinyl acetate copolymers having from 10 to 50, more preferably from 20 to 40,% by weight of vinyl acetate units. Such polymers are, for example, described in DE-OS No. 29 43 469. The addition of such hydrolysed copolymer increases the tensile strength without considerably affecting the elongation at break or the LOI of the compositions.

The hydrolysed ethylene/vinyl acetate copolymers can be added to the compositions before, during or after the dynamic cross-linking of the copolymers I and II.

The preparations according to the invention may contain up to 20 parts by weight of conventional antioxidants, intumescence retardants and flame retardants and other processing auxiliaries. Preferably only halogen-free components are used for this purpose. The group of conventional processing auxiliaries and additives also include plasticisers such as oils, fats and waxes, provided they are free from halogen. The group of conventional age resistors includes, for example, sterically hindered phenols, phenylnaphtylamines, substituted diphenylamines, p-phenylene diamines, ketoneamine condensates, substituted phenols, thiobisphenols, mercapto compounds, imidazoles, benzimidazoles, mercapto-benzimidazoles, phenol condensation products, phenolic esters, polyethers, heavy metal organic compounds, urethane compounds, organic silicone compounds, polymeric amines, polyaryl alkanes, nitriles, benzotriazols, phosphoric acid amides, amines and molecular sieves, carboxylic acid derivatives, aromatic dihydroxy polycarbonates, esters of phosphoric acid, and dihydroquinoline derivatives. When making a choice of auxiliary agents, it should be taken into account that organic or combustible processing auxiliaries are liable to lower the LOI value of the preparation. Components which give rise to a halogen content of less than 2% by weight in the preparation may also be used in exceptional cases.

The preparation according to the invention may be worked up in an internal mixer to give rise to products which form continuous sheets when they are transferred to a rubber roller at temperatures of from 150° to 200° C. The formation of a continuous sheet or a sheet with a smooth surface has proved to be a good rapid test for assessing the thermoplastic processibility of the products. The preparations according to the invention may be prepared in a single stage process in which the polymer already contains filler when it is subjected to dynamic cross-linking or alternatively the thermoplastic polymer mixture (optionally together with auxiliary agents) may first be prepared and may then be intimately mixed with the filler in a second process step after cross-linking. This variation of the process of preparation is preferred with a continuously operating apparatus such as a twin screw extruder or a co-kneader is employed.

The preparations according to the invention may be used wherever a polymer with excellent flame resistance and good mechanical properties is required in the form of plates, webs or tubes. The preparations according to the invention are particularly suitable for use as cable sheaths.

The following examples serve to illustrate the invention in detail.

EXAMPLES

The polymers used in the examples are specified in Table 1. The grain size distribution of the two types of aluminium hydroxide are shown in FIG. 1. ®VULKANOX HS is the trade name for a polymer antioxidising agent based on 2,2,4-trimethyl-1,2-dihydroquinoline, ®IRGAFOS TNPP is the trade name for trinonyl phenyl phosphite and ®PERKADOX 14/40 is the trade name for a granulate which contains 40% by weight of bis-(2-butylperoxy-isopropyl)-benzene. TAC is traillyl cyanurate and NPD is N,N'-m-phenylene dimaleimide; both are co-curing agents. ®CORAX N 550 is a carbon black.

The mechanical properties of the samples were tested according to DIN No. 53 515 (tear propagation resistance) and DIN No. 53 504 (tension test). The LOI was determined according to ASTM D-2863. The samples were punched out of plates which had been moulded at 190° C. under a pressure of 300 bar for 5 minutes. Before the plates were removed from their mould, they were cooled to room temperature under this pressure.

The samples (Table 2) were prepared in a 1 liter laboratory kneader at a shaft temperature of 60° C. and at 60 revs per min. The components of samples 1 and 2 were mixed in the following sequence:

| Time min. | Method |
|---|---|
| 0–3 | Addition first half of aluminium hydroxide, polymer, ®VULKANOX HS and carbon black. |
| 3 | Addition of the second half of aluminium hydroxide. |
| 5 | Sweeping |
| 7 | Ejection |

The sequence of mixing was similar for samples 3 and 4 but ®PERKADOX 14/40 was added at 5'and the mixing time was 9 minutes. The mixing sequence for samples 5 and 6 was as follows.

| Time min. | Method |
|---|---|
| 0–1.5 | Addition of polymer III or V and the first half of aluminium hydroxide. |
| 1.5 | Addition of polymer II. |
| 3 | Addition second half of aluminium hydroxide, ®VULKANOX HS and carbon black. |
| 4.5 | Sweeping |
| 5 | Ejection. |

Samples 7 and 8 were prepared with the same sequence of mixing as samples 5 and 6 except that ®PERKADOX was added at 3'and the total mixing time was about 10 minutes. Sample 8 is a mixture according to the invention. Samples 1 to 4 demonstrate that when the filler content is 100 parts by weight, no significant increase in the LOI can be obtained either by increasing the vinyl acetate content of the ethylene-vinyl acetate copolymer from 40% by weight to 70% by weight (polymer III; V) nor by dynamic cross-linking. A comparison of samples 5 to 8 shows, however, that surprising effects occur when 20 parts by weight of filler are used. Apart from the fact that this high filler content is accompanied by a more than proportional improvement in LOI if the vinyl acetate content of the ethylene/vinyl acetate copolymer is increased from 40% by weight to 70% by weight (polymer IV; V), the dynamic cross-linking also produces an additional increase in LOI.

In addition, the improvement in tensile strength produced by dynamic cross-linking is about twice that obtained with only 100 parts by weight of filler.

The samples (Table 3) were produced in a 1·3 liter laboratory kneader at a shaft temperature of 100° C. and a speed of rotation of 100 revs per min. Samples 14 and 15 are the polymer basis for the preparation according to the invention. Samples 9 to 11 were powdery after the kneading cycle and could not be worked up into a continuous sheet on the roller (T=150° C.). The mixing cycle for these samples was as follows:

| Time min. | Method |
| --- | --- |
| 0-1 | Addition of the polymer, ®VULKANOX HS, magnesium oxide. |
| about 3 | (recorded temperature 160° C.) addition of ®PERKADOX 14/40. |
| about 8 | (recorded temperature 180° C.) addition of ®IRGAFOS TNPP. |
| 10 | Ejection (recorded temperature 200° C.). |

Samples 12 to 15 were prepared with the same sequence of mixing as samples 9 to 11 except that ®PERKADOX 14/40 was added during the first minute.

A comparison between samples 12 and 13 or 14 and 15 shows an unexpectedly great improvement in the mechanical properties of the polymer base of the mixtures according to the invention when an ethylene/vinyl acetate copolymer is used instead of homopolyethylene.

Table 4 shows the mechanical properties of samples 13 and 14 after the samples have been intimately mixed with different quantities of filler (type 1) on mixing rollers (T=150° C.) for 15 minutes.

These examples show that when an ethylene/vinyl acetate copolymer is used instead of a polyethylene homopolymer (compare samples 13, 16 and 17 with 15, 20 and 21), not only are the mechanical properties of the basic polymer mixture substantially improved, but also the capacity for taking up filler is improved since the impairment in mechanical properties produced by the introduction of larger quantities of filler is substantially reduced. Although examples 18 and 19 are preparations according to the invention, a comparison with samples 20 and 21 demonstrate the advantages of the particularly preferred embodiments of the invention.

TABLE 1

| Type | Ethylene/vinyl acetate ratio in the copolymer (% by weight) | MFI* (g/10 Min) | Density at 23° C. DIN 53 479 (kg/l) | Mooney-V at 100° C. M1-4 [ME] | Vicat Softening** (°C.) |
| --- | --- | --- | --- | --- | --- |
| I | 100:0 | 0.25 | 0.928 | — | 108 |
| II | 90:10 | 1.5 | 0.928 | — | 79 |
| III | 60:40 | 2-5 | 0.970 | 16-24 | — |
| IV | 55:45 | 2-5 | 0.980 | 16-30 | — |
| V | 30:70 | 2-6 | 1.06 | 16-24 | — |

*Melt index (190° C./2.16 kp) determined as described in DIN 53 735
**Softening temperature according to Vicat; VST A, DIN 53 460.

TABLE 2

| Sample No. | 1 | 2 | 3 | 4 | 5 | 6 | 7 | 8 |
| --- | --- | --- | --- | --- | --- | --- | --- | --- |
| Polymer II | 35 | 35 | 35 | 35 | 35 | 35 | 35 | 35 |
| Polymer III | 65 | — | 65 | — | 65 | — | 65 | — |
| Polymer V | — | 65 | — | 65 | — | 65 | — | 65 |
| Filler (type 2) | 100 | 100 | 100 | 100 | 200 | 200 | 200 | 200 |
| ®VULKANOX HS | 1.0 | 1.0 | 1.0 | 1.0 | 1.0 | 1.0 | 1.0 | 1.0 |
| ®PERKADOX 14/40 | — | — | 0.5 | 0.5 | — | — | 0.5 | 0.5 |
| ®CORAX N550 | 2.5 | 2.5 | 2.5 | 2.5 | 2.5 | 2.5 | 2.5 | 2.5 |
| Batch temperature* (°C.) | 132 | 153 | 183 | 184 | 160 | 166 | 215 | 213 |
| Tensile strength (MPa) | 5.0 | 3.7 | 6.4 | 6.3 | 6.4 | 5.4 | 8.1 | 8.0 |
| Tear propagation resistance (N/mm) | 25.6 | 15.6 | 25.3 | 14.0 | 20.1 | 19.0 | 12.3 | 6.2 |
| Elongation at break (%) | 740 | 895 | 660 | 600 | 225 | 500 | 215 | 230 |
| LOI | 28 | 31 | 29 | 31 | 48 | 59 | 45 | 71 |

*Random sampling

TABLE 3

| Sample No. | 9 | 10 | 11 | 12 | 13 | 14 | 15 |
| --- | --- | --- | --- | --- | --- | --- | --- |
| Polymer I | 40 | 40 | 40 | 40 | 40 | — | — |
| Polymer II | — | — | — | — | — | 40 | 40 |
| Polymer IV | 60 | 60 | 60 | 60 | — | 60 | — |
| Polymer V | — | — | — | — | 60 | — | 60 |
| ®VULKANOX HS | 0.5 | 0.5 | 0.5 | 0.5 | 0.5 | 0.5 | 0.5 |
| ®PERKADOX 14/40 | 1.875 | 0.75 | 1.5 | 0.25 | 0.25 | 0.25 | 0.25 |
| NDP | 0.9 | 0.9 | — | 0.3 | 0.3 | 0.3 | 0.3 |
| TAC | — | — | 0.9 | — | — | — | — |
| Magnesium oxide | 0.9 | 0.9 | 0.9 | 0.9 | 0.9 | 0.9 | 0.9 |
| ®IRGAFOS TNPP | 0.5 | 0.5 | 0.5 | 0.5 | 0.5 | 0.5 | 0.5 |
| Tensile strength (MPa) | *** | *** | *** | 5.6 | 2.1 | 8.0 | 5.1 |
| Elongation at break (%) | *** | *** | *** | 425 | 545 | 525 | 480 |

*** Material is not thermoplastically processible.

TABLE 4

| | Sample No. | | | | | | | | |
| --- | --- | --- | --- | --- | --- | --- | --- | --- | --- |
| | 13 | 16 | 17 | 14 | 18 | 19 | 15 | 20 | 21 |
| | s.a. | as | as | s.a. | as | as | s.a. | as | as |
| Polymer basis | — | 13 | 13 | — | 14 | 14 | — | 15 | 15 |
| Filler (type 1) | — | 100 | 160 | — | 100 | 160 | — | 100 | 160 |
| Tensile strength (MPa) | 2.1 | 5.8 | 7.3 | 8.0 | 5.8 | 6.2 | 5.1 | 6.1 | 6.7 |

TABLE 4-continued

| | Sample No. | | | | | | | | |
|---|---|---|---|---|---|---|---|---|---|
| | 13 | 16 | 17 | 14 | 18 | 19 | 15 | 20 | 21 |
| Elongation at break (%) | 545 | 419 | 203 | 525 | 260 | 199 | 480 | 380 | 323 |
| LOI | — | 29 | 48 | — | 30 | 41 | — | 30 | 50 |

TABLE 5

| Sample No. | 22 | 23 | 24 | 25 |
|---|---|---|---|---|
| Polymer V | 70 | 70 | 70 | 70 |
| Polymer II | 30 | 30 | 30 | 30 |
| Filler (type 2) | 150 | 150 | 150 | 150 |
| ®VULKANOX HS | 0.5 | 0.5 | 0.5 | 0.5 |
| ®Irgafos TNPP | 0.5 | 0.5 | 0.5 | 0.5 |
| Magnesium oxide | 0.9 | 0.9 | 0.9 | 0.9 |
| ®PERKADOX 14/40 | 0.5 | 0.5 | 0.5 | 0.5 |
| Hydrolysed EVA* | — | 5 | 10 | 20 |
| Tensile strength [MPa] | 6.0 | 7.1 | 8.0 | 8.3 |
| Elongation at break [%] | 280 | 205 | 210 | 190 |
| LOI | 38 | 37 | 35 | 33 |

*The hydrolysed ethylene/vinyl acetate copolymer had a degree of hydrolysis of more than 95% and was made from a copolymer having a content of vinyl acetate units of 30% by weight.

I claim:

1. Halogen-free, thermoplastically processible compositions consisting of
   I. from 20 to 50 parts by weight of an ethylene/vinyl acetate copolymer containing from 5 to 15% by weight of vinyl acetate units,
   II. from 80 to 50 parts by weight of an ethylene/vinyl acetate copolymer containing from 42 to 75% by weight of vinyl acetate units, and
   III. from 150 to 220 parts by weight of mineral filler per 100 parts by weight of components I+II,
characterised in that the copolymers have been dynamically cross-linked.

2. Compsitions according to claim 1, whereby the dynamic cross-linking took place in the presence of filler III.

3. Compositions according to claim 1, whereby the dynamic cross-linking took place in the presence of $$(0.1 \text{ to } 1) \left[ 0.25 + \frac{\text{parts by weight of filler*}}{2000} \right]$$

parts by weight of peroxide or $$(0.1 \text{ to } 1) \left[ 0.8 + \frac{\text{parts by weight of filler*}}{500} \right]$$

parts by weight of (peroxide+co-cross-linking agent), where "filler*" is identical to filler III, the amount being that which is present during the dynamic cross-linking process.

4. Compositions according to claim 1 in which filler III is a member of the group consisting of aluminium hydroxide, hydrated aluminium oxide, magnesium hydroxide, hydrated magnesium oxide and hydrated calcium silicate.

5. Compositions according to claim 1 which also contain 0.1 to 20 parts by weight of hydrolysed ethylene/vinyl acetate copolymer per 100 parts by weight of components I+II.

6. Process for manufacturing the compositions according to claim 1 whereby the components are dynamically cross-linked in the presence or absence of the filler III and, should the filler be absent during the cross-linking process, the filler III is subsequently admixed.

7. Moulded articles which are shaped and moulded from a composition as claimed in claim 1.

8. An improved sheathed cable, the improvement comprises having the sheathing of the cable being fabricated from a composition as claimed in claim 1.

* * * * *